United States Patent
Czaykowski et al.

(10) Patent No.: US 6,457,042 B1
(45) Date of Patent: Sep. 24, 2002

(54) DYNAMIC CONSTRUCTION OF COMPLEX EXECUTION ENVIRONMENTS

(75) Inventors: Jerzy Tadeusz Czaykowski, Southampton; Ian James Mitchell, Eastleigh; Steven Powell, Winchester, all of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/410,233

(22) Filed: Sep. 30, 1999

(51) Int. Cl.[7] .................................................. G06F 9/00
(52) U.S. Cl. ........................ 709/203; 709/201; 709/310; 709/311; 709/312; 709/328; 709/243; 709/330; 709/331
(58) Field of Search .................................. 709/201–203, 709/330, 243, 310–312, 328, 331; 707/9–10

(56) References Cited

U.S. PATENT DOCUMENTS

| | | | | |
|---|---|---|---|---|
| 5,835,757 A | * | 11/1998 | Oulid-Aissa et al. | 707/10 |
| 5,933,639 A | * | 8/1999 | Meier et al. | 717/129 |
| 6,272,522 B1 | * | 8/2001 | Lin et al. | 709/200 |

OTHER PUBLICATIONS

Thomas Bemmer and Roland Wismuller "On line distributed Debugging on Scallable Multiporcessor Architecture" 1995.*

* cited by examiner

Primary Examiner—Dung C. Dinh
Assistant Examiner—Hieu C. Le
(74) Attorney, Agent, or Firm—Edward H. Duffield

(57) ABSTRACT

An application server system has a constructed environment for executing application programs where the system has a plurality of processors, for receiving data from client requests and then modifying the constructed execution environment accordingly and for receiving and returning server data, and an interface for each of the processors, for receiving client request data and server data and returning server data, via the interface to/from its corresponding processor for modification of the execution environment and determination of server data to be returned. Each processor includes a receiving unit for calls containing client request data, a unit for processing the client request data and modifying the execution environment, and a unit for determining that another processor must be invoked, locating the other processor and invoking the other processor using the interface, and passing server data and client request data corresponding to the other processor.

5 Claims, 1 Drawing Sheet

DYNAMIC CONSTRUCTION OF COMPLEX EXECUTION ENVIRONMENTS

BACKGROUND OF THE INVENTION

Client/server computing has become a very popular paradigm for carrying out data processing. A client application makes a request of a server application which performs some data processing work based on the request (and sends a reply to the client if appropriate).

In a computer used as an application server, the client requests received by the server lead to the execution of application programs that carry out the work specified in the requests. The application program will execute in an environment provided by the system software of the server computer. An execution environment is characterized by the types of resources made available to the application program. The characteristics of the environment to be constructed by the server are derived from the information in the request and by the source of the request. (The information in the request might be used in conjunction with extra information in the server configuration data.) For example, the request may be related to a particular user terminal, with some data in a terminal-related piece of main storage, in which case the terminal (the source of the request), and terminal-related data, must be incorporated into the execution environment. In another example the request may be related to a socket connection to a client computer system, in which case the socket (the source of the request) must be made available to the application program via the execution environment. A functionally rich server will be able to provide a richly configurable execution environment, but the precise nature of any particular environment is determined by the information received in the request. Thus, the mechanisms to analyse the request and build the appropriate environment are crucial to the functionality of an application server.

In the prior art, application servers have been structured so that the source of the request determines the initial analysis of the client request data and that, in turn, specifically identifies the execution environment initialization that is required. In some implementations, a client request includes layered request data which is received by the application server. The application server includes a plurality of processors, each dedicated to receiving specific request data and processing this data in order to construct the execution environment within the application server. A first processor receives a request and "peels off" a first layer of request data that pertains to that particular processor, carries out data processing using the first layer of the request in order to construct a specific part of the execution environment, and then passes along the request to a second processor by making a call via the interface to that processor (the processors are prearranged in a linear chain). The second processor then "peels off" a second layer of request data that pertains to that second processor. This second processor then carries out data processing using the second layer of request data in order to construct another specific part of the execution environment and then passes along the request to a third processor which then "peels off" a third layer of the request data, and the process continues until all of the layers of the request have been "peeled off" by corresponding processors in the serial chain, resulting in a complete construction of the execution environment within an application server.

Because of their non-uniform nature, each chain of processor calls is specific to the individual request and its source. This constitutes a very inflexible way of setting up the execution environment within an application server. Because the processors must be called in a specific order, the interfaces to the processors have built-in dependencies. Therefore, the range of client requests that can be served is greatly limited because of the specific format that the requests have to adhere to in order to meet the various dependencies of the processor interfaces of the application

SUMMARY OF THE INVENTION

The present invention provides, in an application server, a system for constructing an execution environment for running an application program, the system having: a plurality of processors, each processor receiving corresponding data from a client request, modifying the execution environment based on such corresponding data from the client request and receiving and returning server data to the system; and a single interface, identical though implemented separately for each of the plurality of processors, the interface receiving client request data and server data and returning server data, such received client request data and server data being passed via the interface to the corresponding processor so that the corresponding processor can modify the execution environment based on such received data and determine server data to return via the interface; wherein each of the processors includes: a unit for receiving a call which includes client request data via the interface; a unit for processing the client request data and modifying the execution environment based upon the client request data; and a unit for determining that a further processor must be invoked, locating the further processor and invoking the further processor using the interface, passing server data and client request data corresponding to the further processor.

Preferably, each of the processors further includes a unit for continuing environment modification after the further processor has been invoked, and determining the server data to be returned by taking into account the server data returned from the further processor.

Preferably, the system further includes a request server for receiving request data from a client application, and the request server makes a call to a primary processor, the primary processor being determined by the source of the request as opposed to being determined by the contents of the client request data.

According to a second aspect, the invention provides a computer program product stored on a computer readable storage medium for, when run on a computer, carrying out the functionality of the system of the first aspect.

Thus, the invention allows the system software in the server to dynamically build and personalize the environment required to execute an application program without a specific knowledge of all the processors involved. In particular, the invention provides a mechanism to allow the components of the environment to be mixed and matched in a flexible manner. Because a uniform interface is provided for each of the processors, the processors can call each other in any order, thus allowing for great flexibility in the construction of complex execution environments. The system software need only identify the first (primary) processor based upon the source of the request to ensure correct construction. Any processor may be invoked as primary because the interface is uniform. New types of environment may be easily incorporated by combining existing processors and adding new ones.

BRIEF DESCRIPTION OF THE DRAWINGS

A preferred embodiment of the present invention will now be described with reference to the following drawing figure.

DESCRIPTION OF THE PREFERRED EMBODIMENT

Figure 1:
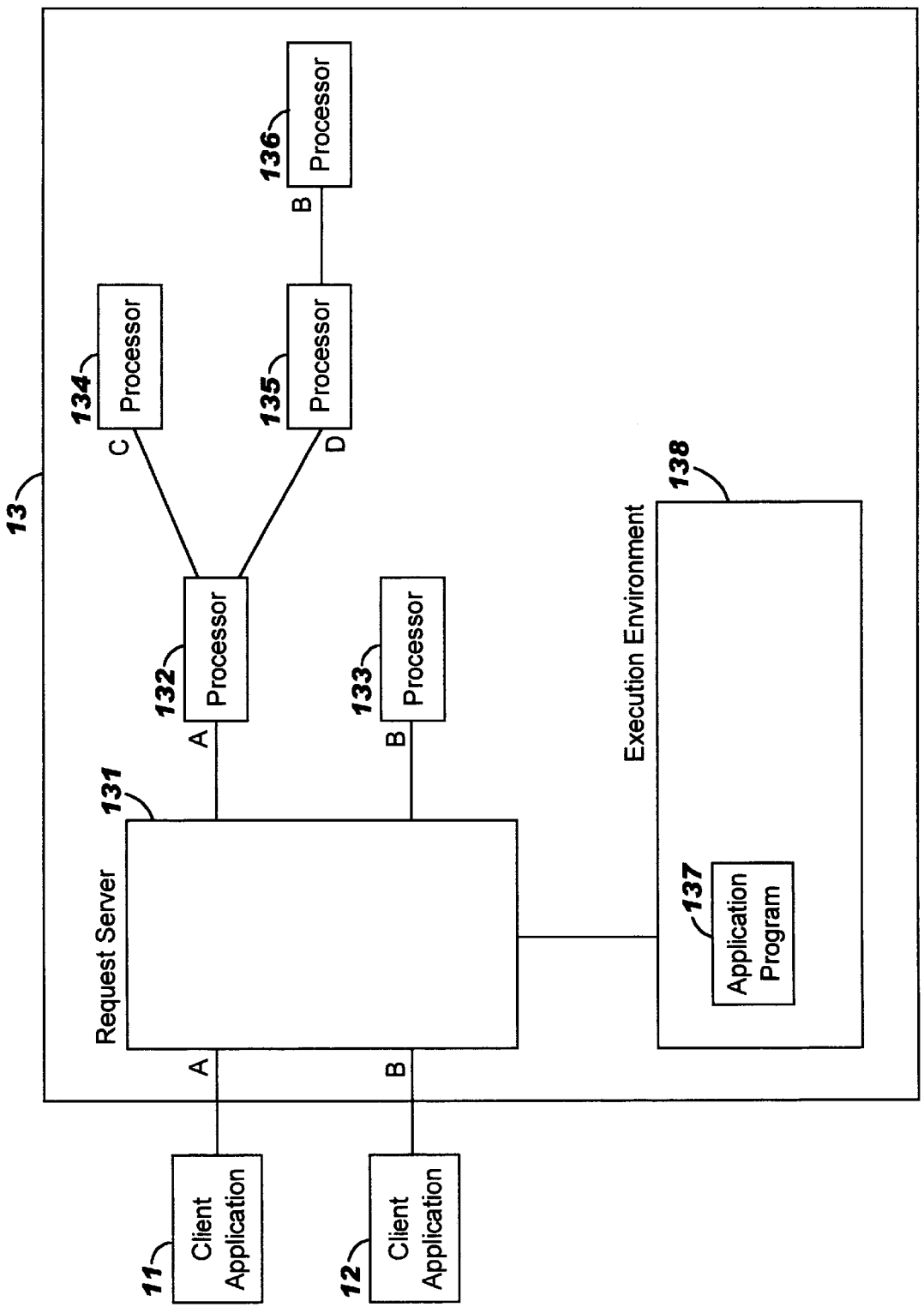
FIG. 1 is a block diagram showing client applications in communication with an application server constructed according to a preferred embodiment of the present invention.

In FIG. 1, client applications 11 and 12 present requests to an application server 13. Client applications 11 and 12 communicate with application server 13 over a network (not shown) such as the Internet in order to send requests to the application server 13, and thus the client applications and the application server are each running on separate machines. Alternatively, some or all of the client applications and application server could be running on the same machine.

A component of the application server, the request server 131, is responsible for receiving and processing requests from client applications. According to an illustrative example, requests from clients of source type A are passed to processor 132 of type A. Requests from clients of source type B are passed to processor 133 of type B. processor 132 then calls processor 134 of type C and subsequently processor 135 of type D. processor 135 then calls processor 136 of type B, which is the same processor, with the same interface, as is called by the request server 131 in response to requests of source type Each processor analyzes the data passed to it to determine both the modifications to the execution environment it requires and whether further processors need to be called. As well as the request data, each processor also receives server data as input and returns server data as output. All processors behave in this way, whether they are called by the request server directly or by other processors.

In this way, the overall execution environment 138 is constructed based on the client request data.

After the single call from the request server 131 to the primary processor (132, 133), the request server 131 passes control (with the request) to the application program 137 in the execution environment 138 which has been constructed.

The uniformity of the interface to each of the processors allows the processors to be called in any order, thus allowing for great flexibility in the construction of complex execution environments. New types of environment may be easily incorporated by combining existing processors in new ways, or introducing entirely new processors (that build new types of resources into the environment) without disrupting existing processors.

We claim:

1. In an application server, a system for constructing an execution environment for running an application program, the system comprising:

a plurality of processors, each processor receiving corresponding data from a client request, modifying the execution environment based on such corresponding data from the client request and receiving and returning server data to the system; and a single interface, identical though implemented separately for each of the plurality of processors, the interface receiving client request data and server data and returning server data, such received client request data and server data being passed via the interface to the corresponding processor so that the corresponding processor can modify the execution environment based on such received data and determine server data to return via the interface;

wherein each of the processors includes:

means for receiving a call which includes client request data via the interface;

means for processing the client request data and modifying the execution environment based upon the client request data; and means for determining that a further processor must be invoked, locating the further processor and invoking the further processor using the interface, passing server data and client request data corresponding to the further processor.

2. The system of claim 1, wherein each of the processors further comprises:

means for continuing environment modification after the further processor has been invoked, and determining the server data to be returned by taking into account the server data returned from the further processor.

3. The system of claim 1 wherein the system further comprises a request server for receiving request data from a client application.

4. The system of claim 3 wherein the request server makes a call to a primary processor, the primary processor being determined by the source of the request as opposed to being determined by the contents of the client request data.

5. A computer program product stored on a computer readable storage medium for, when run on a computer, carrying out the functionality of the system of claim 1.

* * * * *